INVENTOR.
EDWARD D. LAMPARD
BY
ATTORNEY

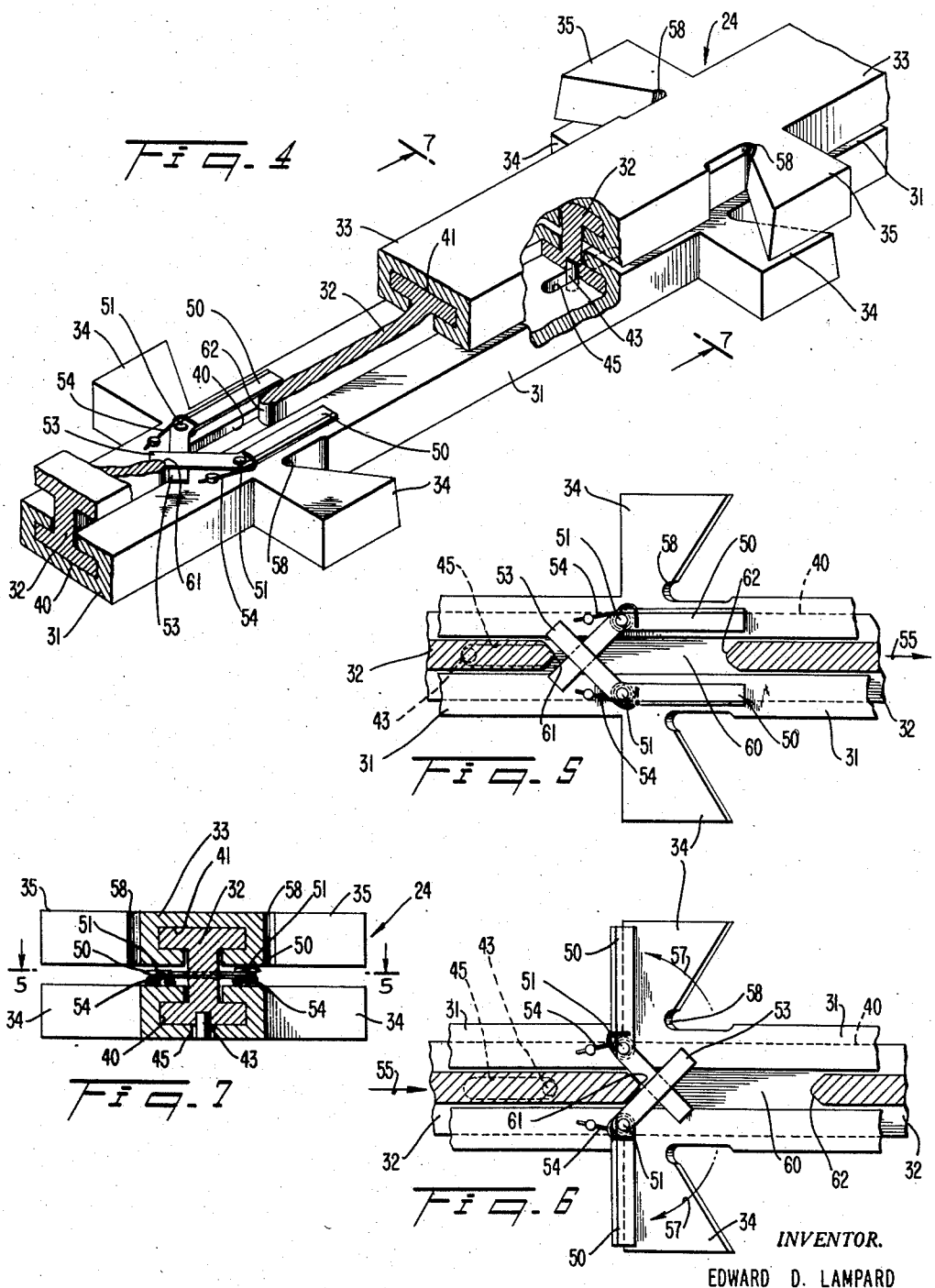

United States Patent Office 2,874,403
Patented Feb. 24, 1959

2,874,403

RACK FOR FORMING, SMOKING AND CUTTING OF SAUSAGES, SUCH AS "FRANKFURTERS" AND THE LIKE

Edward D. Lampard, Grand View on the Hudson, N. Y.

Application April 11, 1956, Serial No. 577,486

4 Claims. (Cl. 17—34)

The present invention relates to improvements in devices for the making of sausages such as "frankfurters" and the like, and more specifically to a new and improved sausage forming and cutting rack.

One object of the present invention is the provision of a device of the character described which will form a plurality of sausages of a predetermined size from a long piece placed on the rack by squeezing the same at equal distances and which will hold the sausages in place safely when inserted into, and taken out of, a smokehouse or the like.

Another object of the present invention is the provision of a device of the character described which will cut "frankfurters" or the like sausages that have an artificial casing to individual sausages, by cutting through the casing, and will cause all the sausages to fall into a receptacle for further stripping.

A further object of the present invention is the provision of a device of the character described which will greatly accelerate and facilitate the forming, cutting and smoking of sausages such as "frankfurters" and the like, and which is so simple in operation that it can be handled without effort as well as without the application of any appreciable amount of skill.

Yet still another object of the present invention is the provision of a device of the character described which is comparatively light in weight, so that it can be transported easily into and out of a smoke house or the like, and which is also sturdy, durable and well adapted for withstanding the rough usage to which devices of this type frequently are subjected.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

Figure 1:
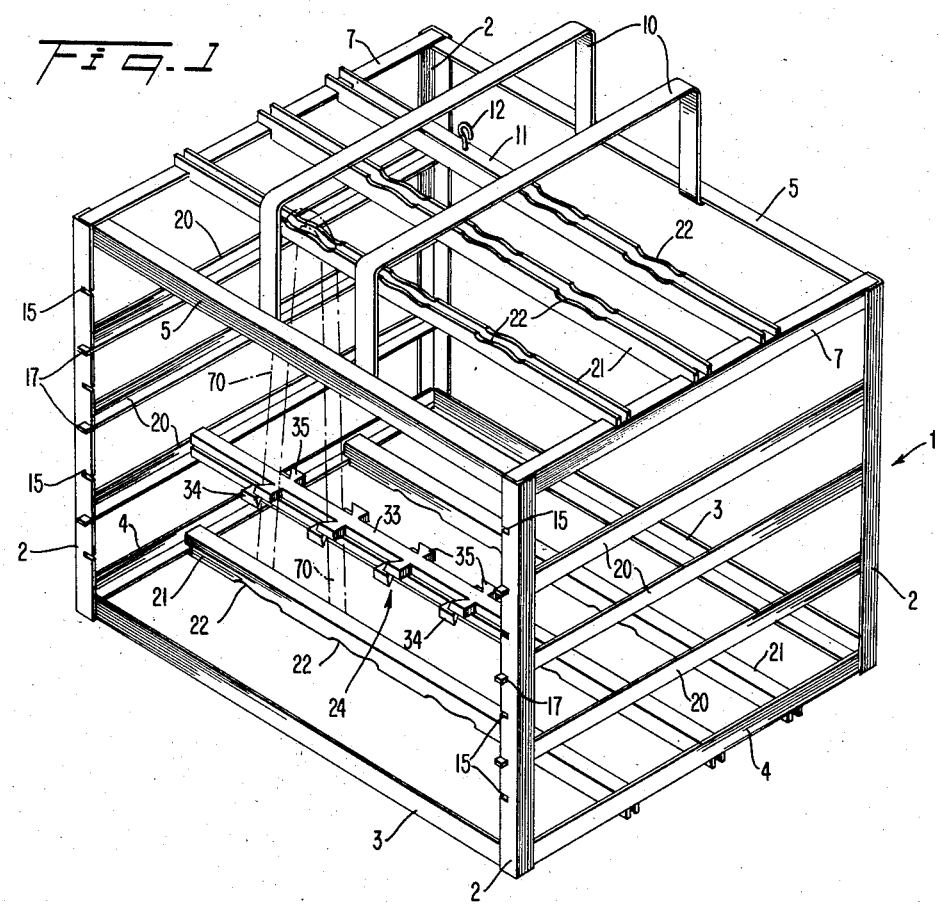
Figure 1 is a perspective view of a preferred embodiment of my invention.
Figure 2:
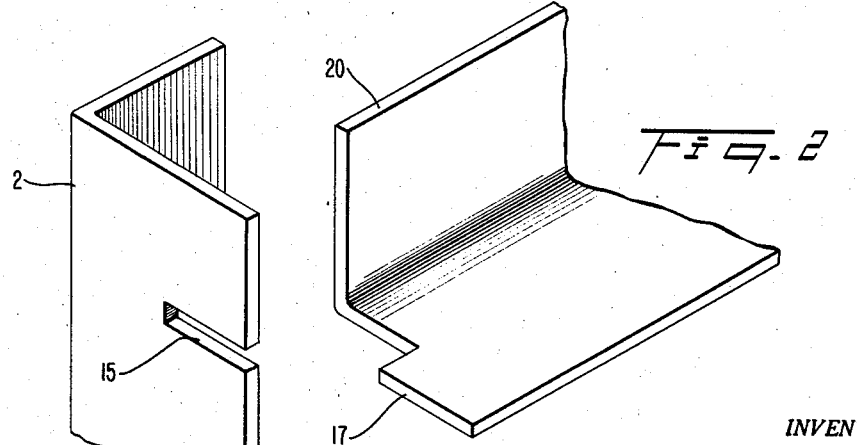
Figure 2 is a partial perspective view of a transverse angle rod.
Figure 3:
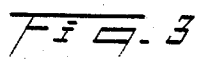
Figure 3 is a partial perspective view of an upright angle bar.

Figure 4 is a perspective view of a detail which I prefer to call a forming and cutting arbor, Figs. 5 and 6 are plan views partly in longitudinal section taken along the line 5—5 in Fig. 7. Fig. 5 shows the structure with the cutting assembly in its normal non-actuated position and Fig. 6 shows the cutting elements after they have been fully actuated with directional arrows indicating the path of the cutting blades, Fig. 7 is a cross-sectional view of the detail of Fig. 4, taken along the line 7—7 in Fig. 4.

Similar reference characters refer to similar parts throughout the several views.

In the drawing the numeral 1 denotes a rack which preferably comprises four upright angle bars, 2 whose lower ends are joined to each other by two pairs of lower angle bars 3 and 4, and whose upper ends are joined to each other by means of two pairs of angle bars 5 and 7. The ends of the bars 1, 2, 3, 4, 5 and 7, which preferably are made of metal, are secured to one another by means of welding or the like. I prefer to secure to the upper bars 5 a pair of U-shaped carrying members 10, which are joined to each other by a traverse bar 11 provided with a hook 12 or the like for facilitating the suspending and transporting the rack 1.

One of the flange portions of each upright bar 2 is provided with a plurality of indentations 15, which are adapted for receiving protruding flange sections 17 of transverse angle rods 20 that are parallel to the bars 4 and 7 and are extended between the bars 2.

U-shaped bars 21, which are parallel to one another, are secured to the bars 4 and 7, as may be seen in Fig. 1. Cutouts 22 are provided on the bars 21 and preferably are equally spaced from one another.

One of the most important elements of my invention is a device which I prefer to call a forming and cutting arbor 24. The same consists of three rods 31, 32 and 33 of steel or the like. The rods 31 and 33 preferably are rectangular in cross-section and are provided with forming wing portions 34 and 35 respectively. Moreover, the rods 31 and 33 have longitudinal dove-tail-shaped grooves or channels 40 and 41 respectively, and the rod 32 is shaped in cross-section as a double dovetail (Figs. 4 and 7) and is slidable in the channels 40 and 41 of the rods 31 and 33. There is downwardly extended from rod 32 a pin 43 through a slot 45 in the rod 31. Cutting members 50 are pivoted by means of pins 51 to the top of rod 31 close to the rear of each pair of wing portions 34. Each cutting member 50 has a portion 53 angularly disposed thereto, and resilient members 54 tend to keep the cutting members 50 in a position in which they are parallel to each other, thereby the portions 53 crossing one another as may be seen in Figs. 4, 5 and 6. When the rod 32 is moved in the direction of the arrow 55 (Figs. 5 and 6) relative to the rod 31, the pin 43 limits the relative movements of the parts 31 and 32. Portions 60 of the rod 32 are reduced and terminate at rounded or pointed cam-shaped edge portions 61 and 62 (Figs. 4 and 6), which are adapted for engaging the portions 53 of the cutting members whenever there is a relative movement between the rods 31 and 32. Thus when the rod 32 is being moved in the direction of the arrow 55 relative to the rod 31, the edge portions 61 force the cutting members 50 to swing around the pivots 51 in the direction of the arrows 57 (Fig. 5), so that the cutting members pass across the excavations 58 at the foot sections of the forming wing portions 34 and 35 (Fig. 6). Upon pulling back the rod 32 to its original position, the impact of the edge portions 62 upon the portions 53 and/or the force of the resilient members 54 cause the cutting members 50 to move back to their parallel positions (Fig. 5).

By means of the aforementioned indentations 15 in the bars 2, which receive the protruding flange sections 17 of the rod 20, the length of the sausage to be made can be regulated. For each pair of bars 21 there is an arbor 24 placed on each pair of rods 20. As is indicated in Fig. 1, there will be nine arbors 24 for three pairs of bars 21 and three pairs of transverse rods 20. "Frankfurters" or the like sausages, which have been made in one long piece are placed on the rack, as is indicated by dotted lines 70 in Fig. 1. Thereby portions of said one long piece are first squeezed into the hook-shaped cutouts 22 of the bars 21 and then hung down and placed between the forming wing portions 34 and 35. These cutouts 22 have a hook formation which in turn forms a link in the sausage. After all the long pieces have been placed properly on the rack 1, the rod 33 is pushed relative to the rod 31, so that the sausage portions will be pushed into the excavations 58 and will be compressed, thus forming the "frankfurters" or sausages. The "frankfurters" thus being held in place and firmly squeezed are smoked, and when taken out of the smoke house they have formed.

"Frankfurters" or any other sausages with artificial casing may be cut to individual "frankfurters" or the like by pushing the rod 32 in the direction of the arrow 55 (Fig. 4 and 5) relative to the rod 31. Thereby the cutting members 50 swing in the direction of the arrows 57, as aforesaid, and cut through the casing, causing the "frankfurters" or the like to fall into a receptacle (not shown), for further stripping.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A rack for forming, smoking and cutting of sausages comprising, upright frame members, spacing members connecting said frame members to each other and keeping them in spaced relation to one another, a plurality of transverse rods extending between said frame members and a plurality of parallel forming and cutting bar assemblies extending between said transverse rods, each of said forming and cutting assemblies including a first rod having a longitudinal groove and laterally protruding wing portions, a second rod also having a longitudinal groove and laterally protruding wing portions, said wing portions on said two rods forming the jaws of a sausage receiving and forming device, and a third rod having portions thereon mounted in the grooves of the first and second rods, the third rod having cam surfaces, and cutting members pivoted to said second rod and having cam engaging portions for engaging the cam surfaces of the third rod, said pivoted cutting members being disposed adjacent to the wing portions of the first two rods for cutting through the casing of the sausage held between the wing portions.

2. In a rack for forming, smoking and cutting sausages a plurality of forming and cutting bars extending through the rack and each bar comprising, a first rod having laterally protruding wing portions, a second rod also having laterally protruding wing portions and a third rod being attached to and longitudinally slideable between said first and second rods and having a reduced section having defined therein cam means, said first and second rods being longitudinally displaceable with respect to each other whereby said wing portions may be moved toward each other for forming a sausage link therebetween, cutting members pivotally mounted on one rod adjacent the wing portions thereof and each cutting member having a cutting edge for cutting the link between the wing portions and a cam engaging portion engaging the cam means of the third rod.

3. A device of the character described comprising, a pair of upright frame members having upper and lower portions as well as side portions, spacing members connecting said frame members to each other and keeping them in spaced relation to one another, a plurality of bars extended between said frame members some of said bars resting upon the upper portions and some of said bars resting upon the lower portions of said upright frame members thereof, a plurality of parallel supporting elements extending between the side portions of said frame members and being thereon adjustably spaced from each other, and a plurality of forming and cutting bars resting upon said supporting elements and being horizontally extended from one of said frame members to the other; each of said forming and cutting bars consisting of a first rod having laterally protruding forming wing portions, a second rod having laterally protruding forming wing portions, a third rod being attached to and longitudinally slideable between said first and second rods engaging in longitudinal grooves thereof and having reduced sections terminating at cam-shaped edge portions and cutting members pivoted to the said second rod and being disposed for engagement by said cam-shaped edge portions so as to swing laterally outward between first and second rods, across said second rod upon sliding said third rod in one direction thereby said cutting members cutting through the casing of a long piece of sausage placed on the rack and engaged by said forming wing portions.

4. A rack for forming, smoking and cutting of sausages comprising, a pair of upright frame members having upper and lower portions as well as side portions, spacing members connecting said frame members to each other and keeping them in spaced relation to one another, a plurality of supporting elements extending between the side portions of said frame members and being thereon vertically adjustably spaced from each other, and a plurality of forming and cutting bars resting upon said supporting elements; each of said forming and cutting bars consisting of a first rod having a longitudinal groove and laterally protruding forming wing portions, a second rod also having a longitudinal groove and laterally protruding forming wing portions, a third rod being of such a cross-sectional formation as to be slideable between first and second rods thereby engaging the longitudinal grooves thereof and having reduced sections at cam-shaped edge portions, and a pair of cutting members having knife portions and arm portions angularly disposed to the knife portions being pivoted at each forming wing portions of said second rod being located thereon in such a manner that the arm portions of each pair of said cutting members cross each other and are in the way of the movement of said cam-shaped edge portions of said third rod so as to be engaged by said edge portions whenever said third rod is being moved relatively to said second rod, so that said cutting members will be caused to swing laterally outward between said first and second rods relative to each other in one direction and to swing back into original position upon sliding said third rod in opposite direction thereby said cutting members cutting through the casing of a long piece of sausage on the rack and engaged by said forming wing portions.

References Cited in the file of this patent

UNITED STATES PATENTS

| | | |
|---|---|---|
| 1,936,354 | Edwards | Nov. 21, 1933 |
| 2,477,413 | Mayer | July 26, 1949 |
| 2,566,966 | Rockoff | Sept. 4, 1951 |
| 2,643,777 | Pickens | June 30, 1953 |